(12) United States Patent
Sone et al.

(10) Patent No.: US 7,595,123 B2
(45) Date of Patent: Sep. 29, 2009

(54) FUEL CELL SYSTEM

(75) Inventors: Koji Sone, Niihama (JP); Satoko Machida, Niihama (JP)

(73) Assignee: Panasonic Corporation, Osaka (JP)

( * ) Notice: Subject to any disclaimer, the term of this patent is extended or adjusted under 35 U.S.C. 154(b) by 890 days.

(21) Appl. No.: 11/022,845

(22) Filed: Dec. 28, 2004

(65) Prior Publication Data
US 2005/0147854 A1  Jul. 7, 2005

(30) Foreign Application Priority Data
Jan. 7, 2004  (JP) .............................. 2004-001520

(51) Int. Cl.
*H01M 8/04* (2006.01)
*H01M 2/00* (2006.01)
*H01M 8/00* (2006.01)

(52) U.S. Cl. .................. 429/22; 429/34; 429/25; 429/13

(58) Field of Classification Search .............. None
See application file for complete search history.

(56) References Cited

U.S. PATENT DOCUMENTS

| | | | | |
|---|---|---|---|---|
| 3,132,973 A | * | 5/1964 | Duddy et al. | 429/26 |
| 3,416,966 A | * | 12/1968 | Oswin | 429/21 |
| 6,506,513 B1 | * | 1/2003 | Yonetsu et al. | 429/34 |
| 7,297,426 B2 | * | 11/2007 | Sakai et al. | 429/23 |
| 2004/0067399 A1 | * | 4/2004 | Kobayashi et al. | 429/25 |
| 2005/0014041 A1 | * | 1/2005 | Becerra et al. | 429/22 |
| 2005/0116798 A1 | * | 6/2005 | Bintoro et al. | 335/78 |

FOREIGN PATENT DOCUMENTS

| | | |
|---|---|---|
| JP | 47-25224 | 7/1972 |
| JP | 49-34088 | 9/1974 |
| JP | 2-148657 | 6/1990 |
| JP | 10-507572 | 7/1998 |
| JP | 2001-313046 | 9/2001 |
| WO | WO 96/12317 | 4/1996 |

* cited by examiner

*Primary Examiner*—Dah-Wei D Yuan
*Assistant Examiner*—Edu E Enin-Okut
(74) *Attorney, Agent, or Firm*—Steptoe & Johnson LLP

(57) ABSTRACT

Electric power is generated by pressurizing an internal pressure of a first fuel tank (C) or a second fuel tank (C2) by pressurized air of an air pump (AP) for supplying air to an air electrode (8) of a cell (1), and supplying fuel fluid to a fuel electrode (7) of the cell (1).

5 Claims, 4 Drawing Sheets

F I G. 4
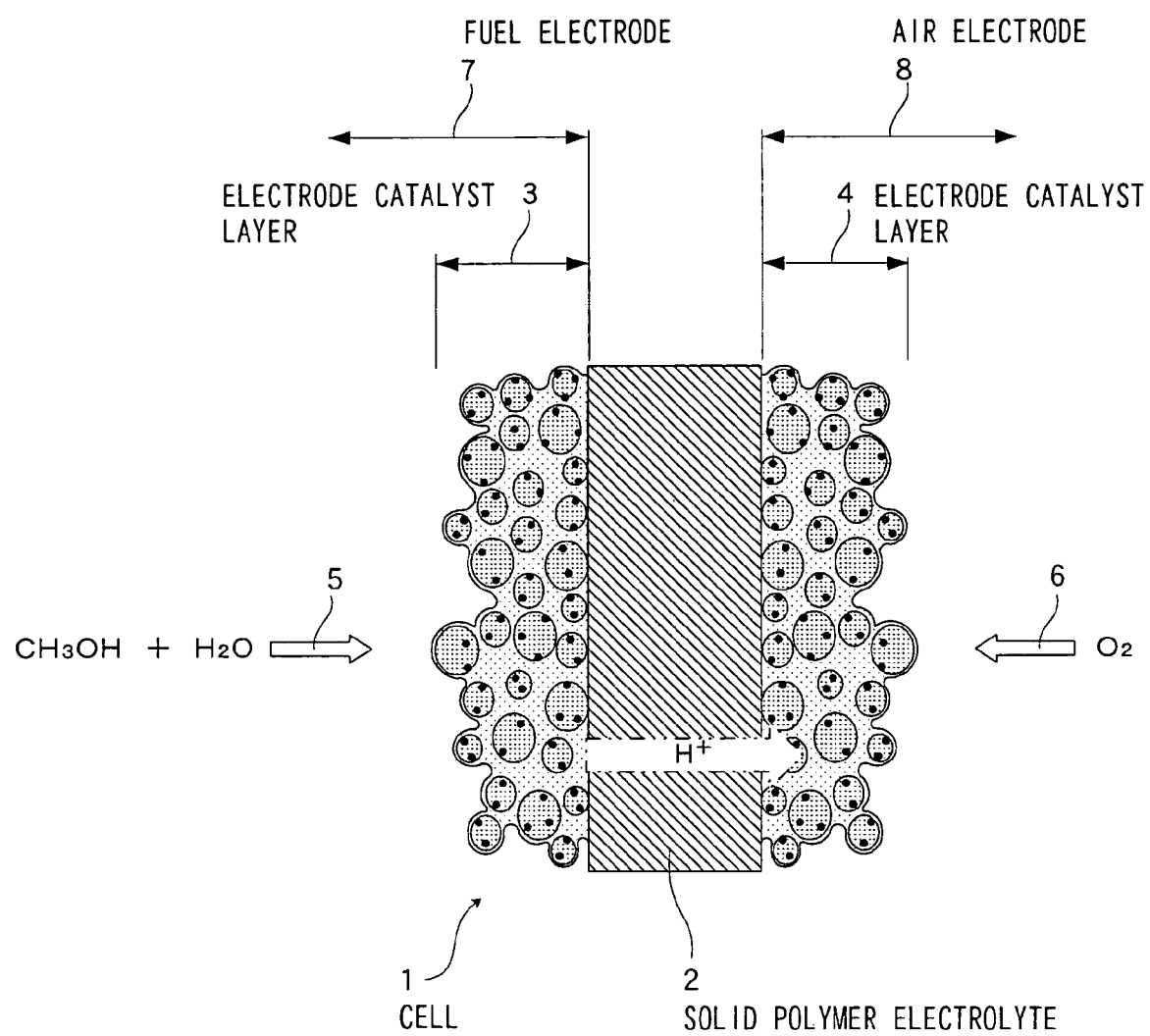

FUEL CELL SYSTEM

FIELD OF THE INVENTION

The present invention relates to a fuel cell for generating electric power using a solid polymer electrolyte.

BACKGROUND OF THE INVENTION

A fuel cell 1 of this type of direct methanol fuel cell (DMFC) is configured as shown in FIG. 4.

The fuel cell 1 of the fuel cell is formed with electrode catalyst layers 3, 4 on both surfaces of a solid polymer electrolyte 2, and is configured so as to supply methanol aqueous solution 5 to one surface of the solid polymer electrolyte 2 via the electrode catalyst layer 3 on one side of the solid polymer electrolyte 2 and to supply oxygen 6 to the electrode catalyst layer 4 on the other side of the solid polymer electrolyte 2 (Kogyo Chosakai Publishing Inc., "ELECTRONIC PARTS AND MATERIALS", February 2003, p. 31, "PORTABLE COMPACT FUEL CELL", Nobuyuki Kamiya).

The principle of electric power generation will now be explained.

The fuel cell 1 is formed with a fuel electrode (anode) 7 including the electrode catalyst layer 3 on one side of the solid polymer electrolyte 2, and an air electrode (cathode) 8 including the electrode catalyst layer 4 on the other side of the solid polymer electrolyte 2. When methanol aqueous solution of the fuel is supplied to the fuel electrode 7, a chemical reaction proceeds at the fuel electrode 7, so that carbon dioxide, protons and electrons are produced.

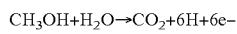

$$CH_3OH + H_2O \rightarrow CO_2 + 6H + 6e-$$

After the protons transmit through the solid polymer electrolyte 2, and the electrons pass through the external circuit, a chemical reaction proceeds at the air electrode 8 with the protons, the electrons, and the oxygen supplied to the air electrode 8, thereby producing water.

The stoichiometric composition of methanol of the methanol aqueous solution and water supplied to the fuel electrode 7 is 1:1 in molar ratio (64% by weight of methanol aqueous solution), but since cell output lowers as the methanol transmits through the solid polymer electrolyte 2 and reaches the air electrode 8 (methanol cross over), the actual optimum concentration is about 3 to 30% by weight, and thus water tends to remain when methanol and water react for electric power generation.

Supply of methanol aqueous solution fuel includes a "liquid fuel natural flow system (passive DMFC system)" in which a liquid chamber of the fuel electrode 7 is filled with methanol aqueous solution, and the fuel is directly supplied to the liquid chamber of the fuel electrode 7 from a tank in accordance with the consumed amount, or a "liquid fuel circulatory system (active DMFC system)" in which the methanol aqueous solution fuel is passed through and circulated in the liquid chamber of the fuel electrode 7, and the methanol fuel is supplied from the methanol fuel tank, in accordance with the consumed amount, to the circulatory tank communicating with the liquid chamber (refer to Japanese Patent No. 2939978, JP-A 10-507572).

Comparing the two systems, the passive system is suited for compactness since a section for circulating the fuel is unnecessary, but as the methanol aqueous solution reacts at the electrode catalyst layer 3 of the fuel electrode 7, methanol is consumed, thereby lowering the methanol concentration and the fuel output. The active system has the liquid fuel circulate in the liquid chamber of the fuel electrode 7, and thus has an advantage of obtaining an output concentration of about 3 to 5 times the passive system.

FIG. 5 cites (Patent Document 2), where the high-concentrated methanol is set in a methanol reservoir tank 9, which methanol reservoir tank 9 is connected to a circulatory tank 11 via a fuel+water injecting device 10. A circulating path is formed so that the methanol aqueous solution 5 taken out from the circulatory tank 11 with a pump 12 returns back to the circulatory tank 11 via the fuel electrode 7 of the fuel cell 1 and a heat exchanger 13. Further, air is supplied to the air electrode 8 of the fuel cell 1 via an oxidant supplying device 14.

Therefore, at the fuel cell 1, the methanol aqueous solution causes the cell reaction, thereby consuming methanol and producing oxygen dioxide. The mixed fluid of low-concentration methanol solution and gas is returned back to the circulatory tank 11, where the liquid and the oxygen dioxide gas are gravity separated, and the oxygen dioxide gas is then released from the upper part of the circulatory tank 11. On the other hand, since the methanol and water are consumed by the cell reaction thereby reducing fuel, a predetermined amount is injected from the fuel+water injecting device 10 into the circulatory tank 11 at a concentration of optimum methanol fuel.

The water produced by the reaction caused by the air supplied via the oxidant supplying device 14 to the air electrode 8 of the fuel cell 1 is collected at a water collecting device 15 and returned back to the fuel+water injecting device 10, and again used as the water to be supplied to the fuel electrode 7. An air pump is usually used as the oxidant supplying device 14.

In such active system, a liquid pump is used as the pump 12 for passing and circulating the methanol aqueous solution fuel to the liquid chamber of the fuel electrode 7, and when air or bubbles are mixed in the flow path, troubles such as, malfunctioning and stopping occur, or failure by foreign materials occur. The dissolved gas of the liquid in the flow path may be generated as bubbles while the pump 12 is stopping, thereby causing malfunction. The liquid pump has higher drive torque compared to the air pump, and thus has a short bearing life span and the performance lowers in a continuous operation of a few hundred hours. Further, when the orientation of the fuel cell is turned upside down, air contacts the outlet of the methanol aqueous solution of the circulatory tank 11, or methanol aqueous solution contacts the outlet of the oxygen dioxide, thereby inhibiting the discharge of the methanol aqueous solution.

Further, the separation and release of the oxygen dioxide gas generated when the methanol aqueous solution causes cell reaction at the electrode catalyst layer 3 of the fuel electrode 7 of the fuel cell 1 are not easily performed, and becomes the cause of lowering of cell output.

When the liquid pump is used to refill the methanol of high concentration of the methanol reservoir tank 9 to the circulatory tank 11, transportation of a small amount of liquid is difficult, and troubles such as, bubbles may arise thereby inhibiting transportation of methanol of high concentration, and further, when the orientation of the fuel cell is turned upside down, air may contact the methanol outlet of the methanol reservoir tank 9 thereby inhibiting the methanol from being discharged. The methanol of high concentration is expensive since a pump made from a special material having resistance to methanol must be used.

The liquid pump is also used in injecting water collected at the water collecting device 15 to the fuel+water injecting device 10, and troubles such as bubbles may arise thereby inhibiting the water from being transported, or when the orientation of the fuel cell is turned upside down, the air may contact the water outlet thereby inhibiting the water from being discharged.

The present invention aims to provide a method of generating electric power of an active fuel cell in which troubles caused by mixing of air or bubbles in the flow path are alleviated, and in which a stable operation can be expected over a long period of time.

The present invention also aims to provide a method of generating electric power for reliably performing the separation and release of the oxygen dioxide gas generated when cell reaction occurs at the electrode catalyst layer of the fuel electrode 7 of the fuel cell 1.

The present invention also aims to provide a method of generating electric power capable of transporting a small amount of methanol of high concentration of the methanol reservoir tank to the circulatory tank without troubles of bubbles and the like as seen with the liquid pump, and that can reliably refill the methanol of high concentration to the fuel electrode irrespective of the orientation of the fuel cell.

The present invention also aims to provide a method of generating electric power that has no troubles of bubbles and the like as seen in the liquid pump, and that reliably injects water irrespective of the orientation of the fuel cell when injecting water collected in the water collecting device 15 to the fuel electrode side.

DISCLOSURE OF THE INVENTION

According to the present invention, a method of generating electric power of a fuel cell has a feature in that in generating the electric power by supplying fuel fluid from a fuel tank to a fuel electrode of the cell and supplying air to an air electrode of the cell, the electric power is generated by pressurizing an internal pressure of the fuel tank to the supply fuel fluid from the fuel tank to the fuel electrode of the cell.

According to the present invention, a method of generating electric power of a fuel cell has a feature in that in generating the electric power by supplying fuel fluid from a fuel tank to a fuel electrode of the cell and supplying air to an air electrode of the cell, the electric power is generated by pressurizing an internal pressure of the fuel tank by pressurized air of an air pump for supplying air to the air electrode of the cell, and supplying the fuel fluid from the fuel tank to the fuel electrode of the cell.

According to the present invention, a method of generating electric power of a fuel cell has a feature in that in generating the electric power by supplying fuel fluid to a fuel electrode of the cell and supplying air to an air electrode of the cell, the electric power is generated by switching between an operation first stage for pressurizing an internal pressure of a first fuel tank in a fuel supplying flow path of first and second fuel tanks arranged on both sides of the fuel electrode of the cell with the fuel electrode as a center, and supplying the fuel fluid in the first tank to the second fuel tank via the fuel electrode, and an operation second stage for pressurizing the internal pressure of the second fuel tank, and supplying the fuel fluid in the second fuel tank to the first fuel tank via the fuel electrode. The method also has a feature in that the internal pressure of the first and second fuel tanks is pressurized by a pressurized air of an air pump for supplying air to the air electrode of the cell. The method also has a feature in that the operation first stage for generating electric power by supplying fuel fluid in the first fuel tank to the second fuel tank via the fuel electrode is switched to the operation second stage upon detection of lowering the liquid level of the fuel fluid in the first fuel tank, and the operation second stage for generating electric power by supplying the fuel fluid in the second fuel tank to the first fuel tank via the fuel electrode is switched to the operation first stage upon detection of lowering the liquid level of the fuel fluid in the second fuel tank.

According to the present invention, a fuel cell for generating electric power by supplying fuel fluid from a fuel tank to a fuel electrode of the cell and supplying air to an air electrode of the cell has a feature in that it comprises: first and second fuel tanks, arranged on both sides of the fuel electrode of the cell with the fuel electrode as a center, for storing fuel fluid; switching circuits, arranged between a pressurized air source and the first and second fuel tanks, for switching so as to supply pressurized air to supply the fuel fluid stored in one of the first and second fuel tanks to the other fuel tank and to release air of the other fuel tank; a first sensor for detecting the liquid level of the fuel fluid in the first fuel tank; a second sensor for detecting the liquid level of the fuel fluid in the second fuel tank; and a controller for instructing the switching circuit to switch to an operation second stage for generating electric power by supplying fuel fluid from the second fuel tank to the first fuel tank to the switching circuit when the first sensor detects the lowering of the liquid level at the operation first stage for generating electric power by supplying fuel fluid to the second fuel tank, and for instructing the switching circuit to the operation first stage when the second sensor detects the lowering of the liquid level at the operation second stage for generating electric power by supplying fuel fluid to the first fuel tank. The fuel cell also has a feature in that the first and second fuel tanks are serpentine fuel tanks. The fuel cell also has a feature in that the first and second fuel tanks are serpentine fuel tanks configured by performing water repellent finish to the internal part of the flow path and using a water repellent material on a flow path pipe. The fuel cell also has a feature in that the switching circuits are latch valves.

According to the present invention, a method of generating electric power has a feature in that in generating the electric power by supplying diluted fuel fluid from a fuel tank to a fuel electrode of the cell and supplying air to an air electrode of the cell, and refilling the fuel fluid consumed by a cell reaction from a fuel reservoir container to the fuel electrode side, the electric power is generated by pressurizing an internal pressure of the fuel reservoir container, and refilling the fuel fluid from the fuel reservoir container.

According to the present invention, a method of generating electric power has a feature in that in generating the electric power by supplying diluted fuel fluid from a fuel tank to a fuel electrode of the cell and supplying air to an air electrode of the cell, and refilling the fuel fluid consumed by a cell reaction from a fuel reservoir container to the fuel electrode side, the electric power is generated by pressurizing the internal pressure of the fuel reservoir container by the pressurized air of the air pump for supplying air to the air electrode, and refilling the fuel fluid from the fuel reservoir container.

According to the present invention, a method of generating electric power has a feature in that in generating the electric power by supplying diluted fuel fluid from a fuel tank to a fuel electrode of the cell and supplying air to an air electrode of the cell, and refilling water consumed by a cell reaction from a water reservoir container to the fuel electrode side, the electric power is generated by pressurizing an internal pressure of the water reservoir container, and refilling the water from the water reservoir tank.

According to the present invention, a method of generating electric power has a feature in that in generating the electric power by supplying diluted fuel fluid from a fuel tank to a fuel electrode of the cell and supplying air to an air electrode of the cell, and refilling water consumed by a cell reaction from a water reservoir container to the fuel electrode side, the electric power is generated by pressurizing an internal pressure of the water reservoir container by a pressurized air of an air pump for supplying air to the air electrode, and refilling the water from the water reservoir tank.

According to the present invention, a method of generating electric power has a feature in that in generating the electric power by supplying fuel fluid from a fuel tank to a fuel electrode of the cell and supplying air to an air electrode of the cell, the electric power is generated by switching between an operation first stage for causing the fuel fluid flow from one side of the fuel electrode of the cell towards the other side thereof, and an operation second stage for causing the fuel fluid flow from the relevant other side of the fuel electrode of the cell towards the relevant one side thereof.

BRIEF DESCRIPTION OF THE DRAWINGS

FIG. 4 is an enlarged cross sectional view of the cell for explaining an electric power generation system of the fuel cell.

DESCRIPTION OF THE PREFERRED EMBODIMENTS

The method of generating electric power of a fuel cell of the present invention will now be explained based on specific embodiments.

Figure 1:
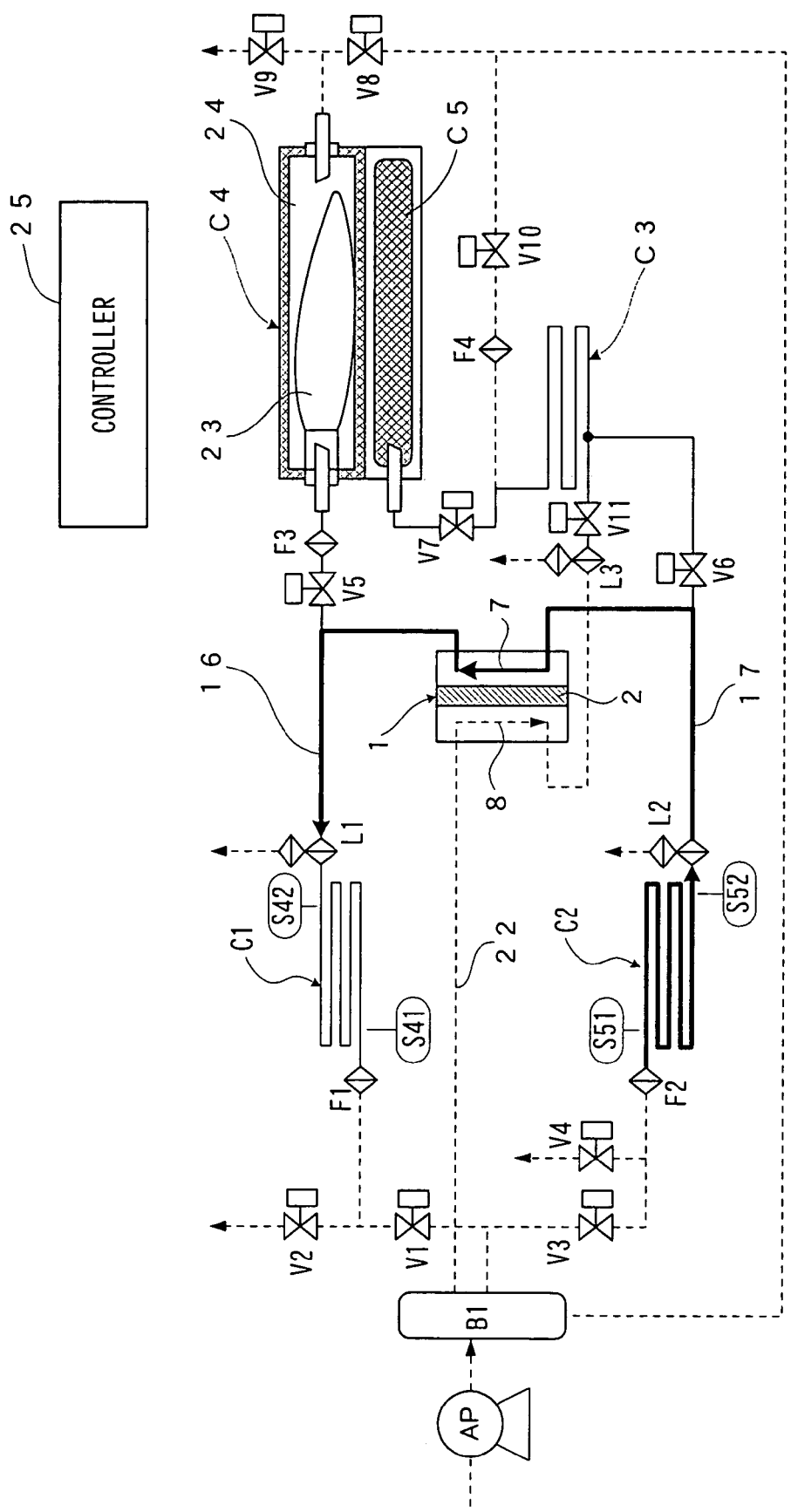
FIG. 1 is a configuration view of a fuel cell assembly performing a method of generating electric power of a fuel cell of the present invention.

In FIG. 1, the fuel cell assembly of the present embodiment is configured by combining a cell 1, first and second fuel tanks C1, C2, a single air pump AP, a buffer tank B1, a water reservoir tank C3, a methanol reservoir container C4, an interconnection path for connecting the above components to one another, and valves or gas/liquid separators connected to the interconnection path and the like.

The cell 1 is, as explained in the conventional example, configured by forming the electrode catalyst layers 3, 4 on both surfaces, respectively, with the solid polymer electrolyte 2 in the middle, and the first and second fuel tanks C1, C2 are arranged on both sides of the fuel electrode 7 with the fuel electrode 7 of the cell 1 in the middle, where the first fuel tank C1 and the fuel electrode 7 are connected by a first fuel supplying flow path 16, and the second fuel tank C2 and the fuel electrode 7 are connected by a second fuel supplying flow path 17.

Figure 2:
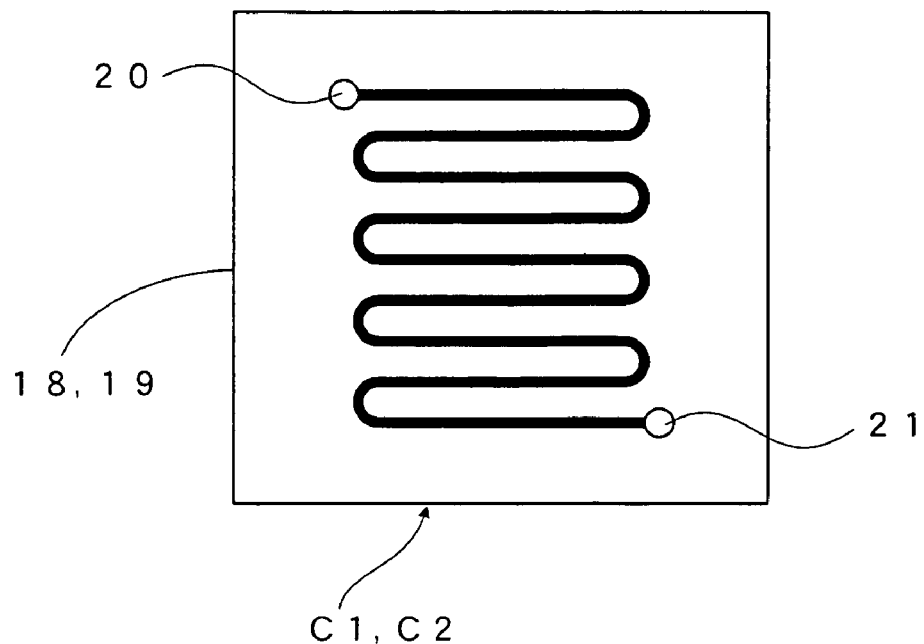
FIG. 2 is a plan view of first and second fuel tanks C1, C2 of the fuel cell assembly.

Here, the first and second fuel tanks C1, C2 are configured by a meandering narrow serpentine fuel tank, as shown in FIG. 2. For example, a first glass substrate 18 formed with a depression forming one part of the meandering path, and a second glass substrate 19 formed with a depression forming one part of the meandering path, the surfaces thereof being symmetrical with respect to the depression of the first glass substrate 18, are laminated so that each depression is arranged in the inside. Reference number 20 is an air inlet/outlet and reference number 21 is a liquid outlet/inlet.

A first gas/liquid separator L1 is arranged at the fuel inlet/outlet (hereinafter referred to as section S42) of the first fuel tank C1, and a second gas/liquid separator L2 is arranged at the fuel inlet/outlet (hereinafter referred to as section S52) of the second fuel tank C2. A first filter F1 of hydrophobic porous membrane is arranged at the air inlet/outlet (hereinafter referred to as section S41) of the first fuel tank C1, and a second filter F2 of hydrophobic porous membrane is arranged at the air inlet/outlet (hereinafter referred to as section S51) of the second fuel tank C2.

The air supplying flow path for supplying air to the air electrode 8 of the cell 1 connects one end of the air electrode 8 and the buffer tank B1 with a pipe line 22, and connects the other end of the air electrode 8 to one end of the water reservoir tank C3 via a third gas/liquid separator L3 and a valve V11. One end of the water reservoir tank C3 is connected to the second fuel supplying flow path 17 via a valve V6. The water reservoir tank C3 is formed into a meandering narrow serpentine tank, similar to the first and second fuel tanks C1, C2. As any of the tanks C1, C2, or C3 has a possibility of the meniscus formed in the flow path collapsing by the impact of drop and the like when the diameter of the flow path becomes too large, they are formed narrow enough so that the meniscus formed in the flow path does not collapse even from the impact of drop and the like.

The buffer tank B1 pressurized by the air pump AP so as to maintain the internal pressure at a target value is connected to the air inlet/outlet of the first fuel tank C1 via a valve V1 and a first filter F1, and the buffer tank B1 is connected to the air inlet/outlet of the second fuel tank C2 via a valve V3 and a second filter F2. Further, the connecting point of the valve V1 and the first filter F1 is connected to the atmosphere via a valve V2. The connecting point of the valve V3 and the second filter F2 is connected to the atmosphere via a valve V4.

A sealed chamber 24 for accommodating a flexible bag 23 enclosing methanol of high concentration (high methanol concentration) is formed in the methanol reservoir container C4, which sealed chamber 24 being connected to the buffer tank B1 via a valve V8. The sealed chamber 24 is further opened to atmosphere via a valve V9. The fuel outlet of the bag 23 is connected to the first fuel supplying flow path 16 via a filter F3 for preventing foreign material from entering and a valve V5. An excess water tank C5 is annexed to the methanol reservoir container C4.

The excess water tank C5 is connected to the end of the water reservoir tank C3 via a valve C7. Further, the relevant end of the water reservoir tank C3 is connected to the buffer tank B1 via the fourth filter F4 of hydrophobic porous membrane and a valve V10.

Figure 3:
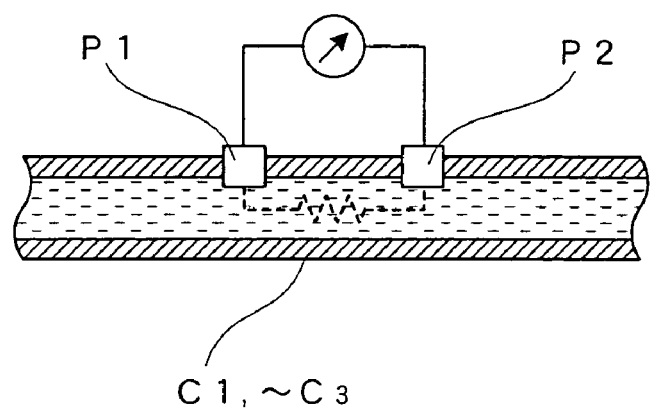
FIG. 3 is an enlarged cross sectional view of main parts of FIG. 2.
Figure 5:
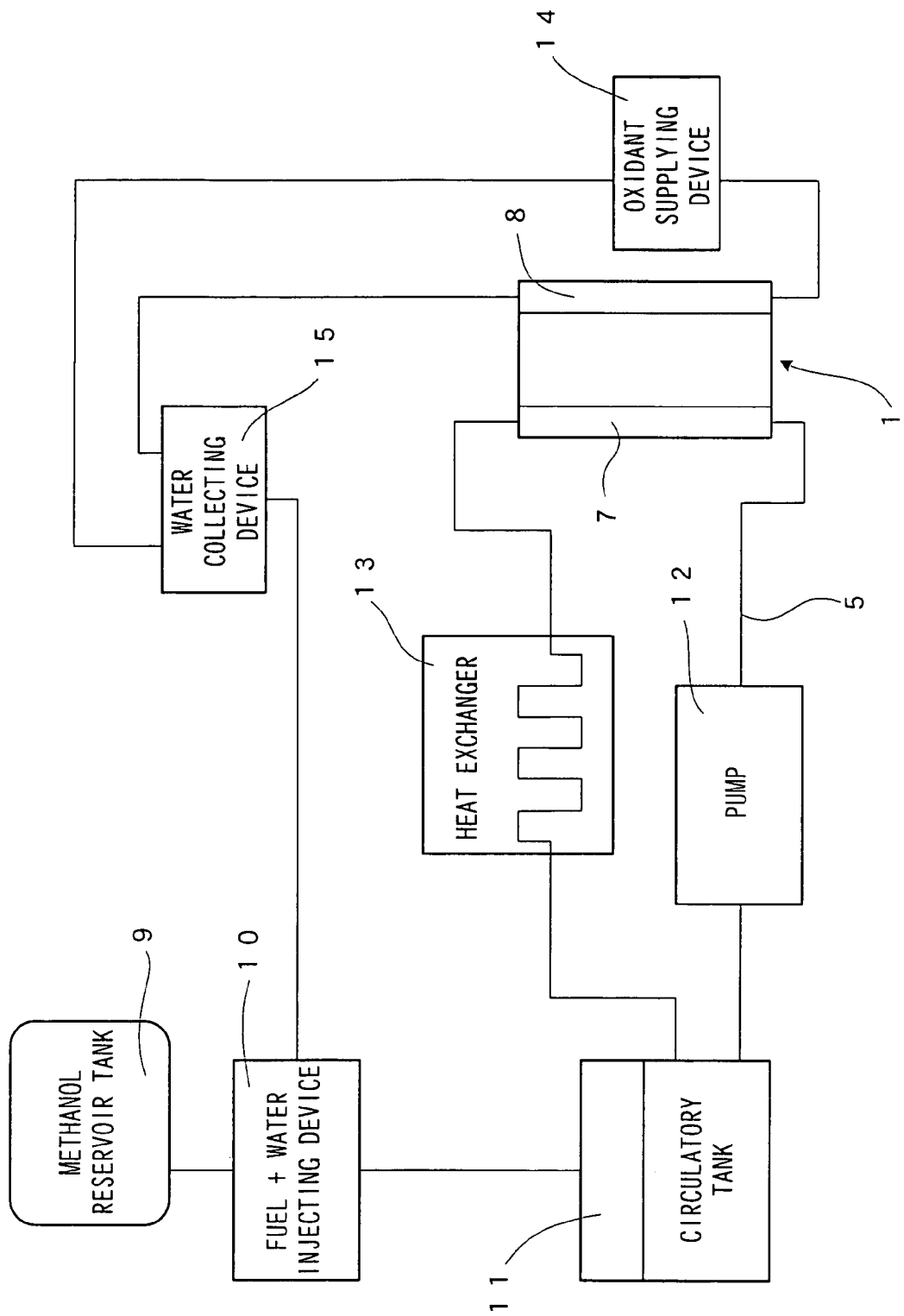
FIG. 5 is a configuration view of a conventional fuel cell.

Electrode P1, P2 serving as a level indicator is provided in each section S42 (fuel inlet/outlet of the first fuel tank C1), section S52 (fuel inlet/outlet of the second fuel tank C2), section S41 (air inlet/outlet of the first fuel tank C1), and section S51 (air inlet/outlet of the second fuel tank C2), as shown in FIG. 3, to distinguish the electrical resistance value of when the methanol aqueous solution is contained between the electrodes P1, P2 and a state when the methanol aqueous solution is not contained in between.

In the present embodiment, the electrodes P1, P2 are each arranged in the sections S41, S42 as a first sensor for detecting the liquid level of the fuel liquid of the first fuel tank C1, and the electrodes P1, P2 are each arranged in the sections S51, S52 as a second sensor for detecting the liquid level of the fuel liquid of the second fuel tank C2.

All of the tanks C1, C2, and C3 are configured by performing water repellent finish to the inside of the flow path or using water repellent material for the flow path pipe. This is to improve worsening of the operation efficiency of the fuel caused from the remains of the water membrane remaining on the wall surface when the flow path wall surface is highly wet.

More specifically, by performing water repellent finish of fluorine series to the inside of the flow path of the tanks C1, C2, C3 or using a pipe material of fluorine series, the fuel movement becomes smooth, the operation efficiency becomes satisfactory, and a clear liquid level detection can be carried out without leaving water membrane or droplets on the flow path partition wall.

In each of the above valves V1 to V11, an electromagnetic valve that can electrically switch between open/close states in accordance with the operational status is used, more preferably, a latch type electromagnetic valve is used in terms of reducing power consumption, in which valve, when a set pulse voltage is applied at a timing of switching between open/close states, flow path is self-held at the open state until the timing in which the set pulse voltage is run down and a reset pulse voltage is thereafter applied; and when the reset pulse voltage is applied, the flow path is self-held at the close state until the timing in which the reset pulse voltage is run down and the set pulse voltage is thereafter applied, where in FIG. 1, the set pulse voltage and the reset pulse voltage are applied to each valve V1 to V11 from a controller 25 in accordance with each operational status. Here, the controller 25 includes a starting dedicated cell for activating various types of valves and the like during start up.

The following description is explained in detail based on "shut down period", "starting period", "supply of methanol aqueous solution", "injection of methanol", "injection of water", and "timing of fuel or water injection" of each operational status.

Shut Down Period

The valves V1 to V11 are all set to the close state, and the methanol aqueous solution is contained in the second fuel tank C2, but the first fuel tank C1 is in an empty state. Further, the fuel electrode 7 of the cell 1 and the first and second methanol aqueous solution flow paths 16, 17 are filled with fuel. The water is contained in the water reservoir tank C3.

Starting Period

When the air pump AP is turned ON, air is supplied to the air electrode 8 of the cell 1 via the buffer tank B1. Due to the flow path resistance of the flow path of the air electrode 8, the pressure of the buffer tank B1 increases to a few kPa and stabilizes, and enters a stand-by state.

Supply of Methanol Aqueous Solution a) Standby Stage

In the standby stage of when supplying the methanol aqueous solution, the valves V1, V3 are set to the close state and the valves V2, V4 are set to the close state by the controller 25.

At this point, the controller 25 checks whether the first fuel tank C1 is empty, and whether the second fuel tank C2 is full from the electrical conductivity of the electrodes P1, P2 of the sections S41, S42, S51, S52. More specifically, the controller 25 checks whether the methanol level of the sections S41, S42 on both ends of the first fuel tank C1 is in a non-methanol detecting state (the methanol non-containing state is hereinafter referred to as "Low") and whether the methanol level of the sections S51, S52 on both ends of the second fuel tank C2 is in a methanol detecting state (methanol containing state is hereinafter referred to as "High").

When the first fuel tank C1 is not in the empty state, and the second fuel tank C2 is not in the full state, the controller 25 sets the valves V2, V3 in the close state and the valves V1, V4 in the open state, and then supplies pressurized air to the first fuel tank C1 via the valve V1 and the filter F1 from the buffer tank B1, thereby moving the methanol aqueous solution remaining in the first fuel tank C1 through the first fuel supplying flow path 16, the fuel electrode 7, the second fuel supplying flow path 17, and the gas/liquid separator L2 and into the second fuel tank C2, and the air pushed out from the second fuel tank C2 is released to atmosphere from the filter F2 via the valve V4.

Thus, the controller 25 implements the next operation first stage after the first fuel tank C1 is in the empty state and the second fuel tank C2 is in the full state.

b) Operation First Stage

In this state, the valves V1, V4 are set to the close state, and the valves V2, V3 are set to the open state, and the pressurized air is supplied from the buffer tank B1 to the second fuel tank C2 via the valve V3 and the filter F2, whereas in the first fuel tank C1, the internal air is released to atmosphere via the filter F1 and the valve V2, and thus the methanol aqueous solution pushed out to the second fuel supplying flow path 17 from the second fuel tank C2 after gas/liquid separated at the gas/liquid separator L2 passes through the fuel electrode 7. Such pass through at the fuel electrode 7 consumes methanol and water thereby producing carbon dioxide gas, and the methanol aqueous solution that became a gas/liquid mixture flow passes through the first fuel supplying flow path 16 and the carbon dioxide gas of the gas/liquid mixture flow is separated at the gas/liquid separator L1, and released to atmosphere. Only the methanol aqueous solution remaining after the gas/liquid separation is flowed into the first fuel tank C1 via the gas/liquid separator L1.

Due to such flow path configuration, a flow path liquid level interface is formed at the first fuel tank C1, which liquid level passes through the section S42 and moves towards the section S41.

The controller 25 detecting that the methanol aqueous solution has reached section S41 switches to the next operation second stage.

c) Operation Second Stage

This operation second stage is the operation stage for moving the methanol aqueous solution from the first fuel tank C1 to the second fuel tank C2. More specifically, the valves V2, V3 are set to the close state, the valves V1, V4 are set to the open state, and the pressurized air is supplied from the buffer tank B1 to the first fuel tank C1 via the valve V1 and the filter F1, whereas in the second fuel tank C2, the internal air is released to atmosphere via the filter F2 and the valve V4, and thus the methanol aqueous solution pushed out to the first fuel supplying flow path 16 from the first fuel tank C1 after gas/liquid separated at the gas/liquid separator L1 passes through the fuel electrode 7. Such pass through of the fuel electrode 7 consumes methanol and water, thereby producing carbon dioxide gas, and the methanol aqueous solution that became the gas/liquid mixture flow passes through the second fuel supplying flow path 17 and the carbon dioxide gas of the gas/liquid mixture flow is separated at the gas/liquid separator L2, and released to atmosphere. Only the methanol aqueous solution remaining in the gas/liquid separation is flowed into the second fuel tank C2 via the gas/liquid separator L2.

Here, when the section S41 of the first fuel tank C1 does not become the "High" level even if the section S52 of the second fuel tank C2 is at the "Low" level at the end of the operation first stage, the controller 25 detects such state and injects methanol of high concentration to the first fuel supply path flow 16 and injects water to the second fuel supplying flow path 17.

Injection of Methanol of High Concentration

When injecting methanol of high concentration, by having the valves V5, V9 in the close state and the valve V8 in the open state, and supplying the pressurized air to the sealed chamber 24 of the methanol reservoir container C4 from the buffer tank B1 via the valve V8, the pressure of the supplied pressurized air is applied to the bag 23. Such state is considered as the waiting state. With the valve V5 in the open state, the methanol of high concentration is injected from the bag 23 to the first fuel supplying flow path 16 via the filter F3 and the valve V5 when the bag 23 is squashed by the pressure of the supplied pressurized air. This injection is performed until the controller 25 detects that the section S41 is in the "High" level.

Injection of Water

During the repeated operation of the operation first stage and the operation second stage, the water is stored in the water reservoir tank C3 in the following manner. When the valves V7, V11 are set to the open state and the valves V10, V6 are set to the close state, the water+non-reactive air mixed fluid that has passed through the air electrode 8 of the cell is flowed into the gas/liquid separator L3, where the non-reactive air is released to atmosphere, and only water is passed through the hydrophilic filter of the gas/liquid separator L3 and through the valve V11 and stored in the water reservoir tank C3. When water is fed to the water reservoir tank C3, the liquid level of the gas-liquid of the water reservoir tank C3 moves towards the excess water tank C5 as the water increases. The excess water tank C5 is, more specifically, configured with a porous material annexed to the external side of the sealed chamber 24 of the methanol reservoir container C4, and the excess water exceeding the capacity of the water reservoir tank C3 is absorbed and held by the porous material of the excess water tank C5 and then evaporated and released to atmosphere from the porous material.

The injection of the water from the water reservoir tank C3 to the second fuel supplying flow path 17 is implemented in the following manner. In this case, the controller 25 sets the valves V7, V11 in the close state, and the valves V6, V10 in the open state. By setting the valve V8 in the close state, the pressurized air is supplied from the buffer tank B1 to the water reservoir tank C3 via the valve V10 and the filter F4, and the water stored in the water reservoir tank C3 is injected to the second fuel supplying flow path 17 via the valve V6. The injection is performed until the controller 25 detects that the section S51 is in the "High" level. After the finish of the injection, the controller 25 returns the valves V7, V11 to the open state, and the valves V10, V6 to the close state.

The timing of each of the above cases of "injection of methanol of high concentration" and "supply of water" is when the section S51 does not enter the "High" state even when the section S42 is in the "Low" state in case of transporting fuel from the first fuel tank C1 to the second fuel tank C2 if methanol and water are consumed in the fuel electrode 7. The controller 25 checks the methanol concentration at this point and injects the methanol of high concentration when determined that the concentration is low, and injects water when determined that the concentration is high.

The detection of the methanol concentration is read directly from the output of the methanol concentration sensor (not shown) provided on at least one of the first fuel supplying flow path 16 or the second fuel supplying flow path 17, or read indirectly from the generated electric power of the cell.

The methanol of high concentration and water injected to the first fuel supplying flow path 16 and the second fuel supplying flow path 17 in such way are rapidly and evenly mixed by the repeated operation of the operation first stage and the operation second stage.

The volumes of the first fuel tank C1 and the second fuel tank C2 are preferably equal to or greater than the flow path volume from the first fuel supplying flow path 16 to the second fuel supplying flow path 17 including the flow path of the fuel electrode 7 of the cell 1. This is because the fuel of the cell 1 is changed in a single direction.

The measurement of current/voltage characteristics of the cell 1 is performed in the fuel cell assembly in which the supply of fuel to the fuel electrode 7 of the cell 1 is performed as the bi-directional supply by the repeated operation of the operation first stage and the operation second stage. As a result, the change of current and voltage at a timing of switching between the operation first stage and the operation second stage is not detected. The change is assumed to be equal to or less than 1 mW.

Further, in case of a single direction, a state in which the inlet of the fuel electrode of the cell 1 has no gas and rich methanol concentration, and the outlet has large amount of gas and low methanol concentration continuously occurs. Since the output of electric power generation is high on the inlet side and the output of electric power generation is low on the outlet side, the life span of the inlet side of the air electrode is caused to be shorter, and since the concentration on the inlet side is constantly high, and thus the methanol cross over occurs and the output can not increase. In case of bi-direction as in the above embodiment, the output of the MEA membrane is averaged, and thus the load of the MEA is also averaged. The methanol concentration of the inlet and the outlet is switched between low and high, and thus the methanol cross over is reduced.

Consequently, the output is increased and in discharging bubbles, the discharging performance of the bubbles at the outlet is lowered in case of the single direction, but in case of bi-direction, the inflow direction changes, and thus even if the amount of bubbles at the outlet is large and the discharging performance is low, the outlet is switched to the inlet and thus, the discharging performance of bubbles becomes satisfactory due to the force of flow of the liquid, lack of fluid fuel supply rarely occurs, and a stable operation is expected over a long period of time.

As the air pump AP for feeding air to the air electrode 8 is also used in the fuel supply to the fuel electrode 7, compared to a case in which fuel is supplied to the fuel electrode 7 with a liquid pump arranged separate from the air pump AP for supplying air to the air electrode 8 as in the conventional art, only a single motor is needed and thus a compact and light device can be realized. Additionally, priming must be supplied for start up when the fuel is supplied to the fuel electrode 7 using the liquid pump, but in the present embodiment, since the air pump AP for supplying air to the air electrode 8 can be used for supplying fuel to the fuel electrode 7, a reliable start up can be achieved without the need of priming.

The air pump AP for supplying air to the air electrode 8 is used also in injecting the methanol of high concentration from the methanol reservoir container C4 to the first fuel supplying flow path 16, and thus the pump made from a special material having resistance to methanol becomes unnecessary, and is suitable for transporting a slight amount of methanol. Even when the orientation of the fuel cell is reversed and the air contacts the methanol outlet of the methanol reservoir container C4, the methanol can be reliably injected.

In case of a circulatory tank using gravity separate method, there is a possibility of being turned upside down in a portable fuel cell, and carbon dioxide gas not being released. Since the liquid level vibrates, the liquid level sensor may malfunction. Further, if vibrated, the circulatory tank may be shuffled causing a large amount of bubbles to be mixed in the liquid, thereby malfunctioning the air pump, but in the above embodiment, the shapes of the first and second fuel tanks C1, C2 are formed with pipe lines, and thus the liquid level of the methanol and air is constant irrespective of the orientation of the fuel cell and a stable operation can be expected.

The present invention enhances reliability of the fuel cell and makes the fuel cell compact and light, and is useful in various portable apparatuses using such type of fuel cell as a power source. According to the method of generating electric power of fuel cell of the present invention, in generating electric power by supplying the fuel liquid from the fuel tank to the fuel electrode of the cell, and supplying air to the air electrode of the cell to generate, the internal pressure of the fuel tank is pressurized to provide the fuel fluid from the fuel tank to the fuel electrode, the fuel fluid consumed by the cell reaction is refilled from the fuel reservoir container to the fuel electrode side by pressurizing the internal pressure of the fuel reservoir container, or the water produced by the cell reaction is refilled from the water reservoir tank to the fuel electrode side by pressurizing the internal pressure of the water reservoir tank, and thus the object can be achieved using the air pump and not the liquid pump.

By using the air pump for supplying air to the air electrode as such air pump, the pump for the air electrode and the pump for the fuel electrode can be unified.

Further, by arranging the first and second fuel tanks on both sides with the fuel electrode of the cell as the middle, and generating electric power by switching between the operation first stage and the operation second stage, the discharge of bubbles at the fuel electrode can be satisfactorily performed, and the methanol cross over of when using the methanol aqueous solution as the fuel is reduced, and thus a stable operation is expected over a long period of time.

What is claimed is:

1. A fuel cell system for generating electric power by supplying fuel fluid from a fuel tank to a fuel electrode of the cell and supplying air to an air electrode of the cell, the fuel cell system comprising:
   a fuel cell having a fuel electrode;
   first and second fuel tanks connected to opposite ends of the fuel electrode of the cell, the first and second fuel tanks for storing fuel fluid therein;
   pipe lines connected to the first and second fuel tanks, each pipe line having at least one air inlet/outlet and at least one fuel inlet/outlet;
   a pressurized air source;
   a first valve located in a first air flow path connected between the pressurized air source and the first fuel tank, the first valve for opening and closing the first air flow path;
   a second valve located in a second air flow path branched from the first air flow path at a point between the first valve and the first fuel tank, and connected to an atmosphere outside the fuel cell system,
   a third valve located in a third air flow path connected between the pressurized air source and the air inlet/outlet of the second fuel tank,
   a fourth valve located in a fourth air flow path branched from the third air flow path at a point between the third valve and the second fuel tank, and connected to an atmosphere outside the fuel cell system, the first, second, third, and fourth valves for switching between a first operation stage and a second operation stage,
   a first sensor for detecting a level of a fuel fluid in the first fuel tank;
   a second sensor for detecting a level of a fuel fluid in the second fuel tank; and
   a controller for instructing the first, second, third, and fourth valves to switch to the second stage when the second sensor detects a lowering of a liquid level in the second fuel tank, and instructing the first, second, third, and fourth valves to switch to the first stage when the first sensor detects a lowering of a liquid level in the first fuel tank,
   wherein the first and fourth valves close and the second and third valves open in the first stage, thereby providing pressurized air to the second fuel tank, transferring a fuel fluid from the second fuel tank to the first fuel tank via the fuel cell and, releasing air from the first fuel tank through the second valve to an atmosphere outside the fuel cell, and
   the first and fourth valves open and the second and third valves close in the second stage, thereby providing pressurized air to the first fuel tank, transferring a fuel fluid from the first fuel tank to the second fuel tank via the fuel cell, and releasing air from the second fuel tank to an atmosphere outside the fuel cell via the fourth valve.

2. The fuel cell according to claim 1, wherein the first and second fuel tanks are serpentine fuel tanks.

3. The fuel cell according to claim 1, wherein the first, second, third, and fourth valves are latch valves.

4. The fuel cell according to claim 2, further comprising a water repellent finish coated on an internal part of a flow path.

5. The fuel cell according to claim 1, further comprising an air electrode, wherein the pressurized air source is connected to the air electrode of the cell by a fifth air flow path for providing the air electrode with the pressurized air.

* * * * *